United States Patent [19]

Stoll

[11] Patent Number: 4,987,822

[45] Date of Patent: Jan. 29, 1991

[54] LINEAR ACTUATOR

[75] Inventor: Kurt Stoll, Esslingen, Fed. Rep. of Germany

[73] Assignee: Festo KG, Esslingen, Fed. Rep. of Germany

[21] Appl. No.: 389,004

[22] Filed: Aug. 2, 1989

[30] Foreign Application Priority Data

Aug. 18, 1988 [EP] European Pat. Off. ........ 88113407.6

[51] Int. Cl.[5] .............................................. F16D 33/06

[52] U.S. Cl. ........................................ 91/358 R; 91/1; 91/DIG. 4

[58] Field of Search ................ 91/1, 358, 361, DIG. 4

[56] References Cited

U.S. PATENT DOCUMENTS 3,452,645 7/1969 Barltrop ................................ 91/1 X 4,889,035 12/1989 Goodnow ....................... 91/DIG. 4

FOREIGN PATENT DOCUMENTS 8632990 5/1987 Fed. Rep. of Germany .

8603346 7/1987 Fed. Rep. of Germany .

*Primary Examiner*—Allen M. Ostrager

*Attorney, Agent, or Firm*—Flynn, Thiel, Boutell & Tanis

[57] ABSTRACT

A linear actuator comprising a linear motor, more especially in the form of a pneumatic motor, which has a housing containing an axially moving piston which is connected with an actuating rod extending out of the motor housing at a working end thereof, a control device, for instance in the form of valve means, for operation of the motor, and a sensor means responsive to certain positions of the actuating rods. In order to simplify and cheapen production of such an actuator while facilitating and speeding up installation of the linear motor, the control device and sensor device are permanently connected to form a readily handled working unit, and the control device and the sensor device are arranged on the control end, opposite to the working end, of the linear motor.

11 Claims, 2 Drawing Sheets

LINEAR ACTUATOR

BACKGROUND OF THE INVENTION

The invention relates to a linear actuator comprising a linear motor, more especially in the form of a pneumatic motor, which has a housing containing an axially moving piston which is connected with an actuating rod extending out of the motor housing at a working end thereof, a control device, for instance in the form of valve means, for operation of the motor, and a sensor means responsive to certain positions of the actuating rod.

In such linear actuators the linear motor is normally in the form of a cylinder and piston unit, whose piston rod connected with the piston and extending out of the cylinder represents the actuating rod, which is able to be connected with a component to be moved or with some other load. The linear motor is placed in the position where it is to be used and the driving fluid, as for instance compressed air, is supplied and vented via pressure lines such as flexible hose. In order to control the flow of the driving fluid devices are employed, which are frequently in the form of valve devices such as electromagnetically operated ones. In order to cause automatic operation of the motor there may be a sensor device, which may comprise one or more sensors such as electrical, magnetic, pneumatic or mechanical sensors, with which certain positions of the actuating rod may be detected in order to operate the control device in accordance therewith. Linear drive actuators as so for available possess a large number of individual groups of components as for instance the linear motor, the control device and the sensor means, which are produced separately from each other and are also separately installed. The operations required for such assembly and production are slow and furthermore extensive wiring and conductor laying operations are required in order to connect the individual components with each other as a circuit. In addition to the extensive assembly operations the considerable space requirement is a disadvantage and furthermore the line connections tend to be readily damaged by moving machine parts.

SUMMARY OF THE INVENTION

Accordingly one object of the present invention is to device a linear actuator of the initially specified type which is able to be more simply and cheaply produced then previous actuators.

A further object of the invention is to devise such an actuator which is able to be more quickly and simply fitted.

In order to achieve these and/or other objects appearing from the specification, claims and drawings herein, the linear motor, the control device and sensor device are permanently connected to form a readily handled working unit, and the control device and the sensor device are arranged on the control end, opposite to the working end, of the linear motor. Accordingly the linear motor and the two devices are collected together in the form of a compact working unit, which may be fitted at the position where it required quite simply as a whole. The connections required between the individual component groups may in each case be prefabricated so that in the fitted condition it is only necessary to provide a central connection for the electrical and/or pneumatic system. The linear actuator constitutes a coupled drive system which is adapted to the respective application and which may be sold as a complete system so that for the assembly of a linear actuator it is no longer necessary for the user, as in the past to fit a large number of separately ordered parts, a process which in any casse is likely to lead to assembly errors. Since the control device and the sensor device are furthermore arranged on the control end of the linear actuator opposite to the working end thereof, it is possible to achieve a slim structure for the actuator which may be accommodated in systems where space is at a premium, the control and sensor devices being simultaneously covered over and protected by the linear motor. Furthermore, the length of the system of lines between the individual components may be greatly reduced owing to their direct vicinity to each other.

Further embodiments of the invention are described in the claims.

In accordance with one such development the linear motor, the control device and the sensor device are connected with each other detachably, more particularly in a replaceably manner and the control device and the sensor device form a sub-unit which in the longitudinal direction of the linear motor as seen from the working end is at least substantially covered by the motor housing. These features make possible a simple replacement of individual components in the case of failure and furthermore a particularly narrow design.

As part of further developments of the invention, which ensure optimum protection of both the control device and also the sensor device and furthermore a relatively smooth surface of the actuator so that handling is facilitated, the control device and the sensor device are accommodated in a common device housing, which is at least in part formed by the motor housing and is fixed to the control end of the linear motor, more particularly in detachable manner, by screw means in a flange joint. The motor housing and the control device and furthermore the sensor device may be accommodate din a common encasing housing with the two devices being additionally arranged in a device housing arranged in the interior of the encasing housing. It is possible to have an operating rod, secured on the end of the piston opposite to the actuating rod end and preferably coaxial to the latter rod, such operating rod being connected with the arrangement consisting of the piston and the actuating rod so as to move therewith, such operating rod having, on its part extending out of the motor housing, at least one operating or switch part cooperating with the sensor device for operating the same. The sensor device may have at least one sensor, which is preferably able to be adjusted in the direction of motion of the operating rod and more especially in the form of proximity sensor responding to the switching part. These latter features lead to the further advantage that there is additional space for the production of a switching or operating signal from the actuating rod, since fitting space, which is in any case present for the control device and the control and the sensor devices is made use of.

According to a further possible feature of the invention the linear motor, the sensor device and the control device are arranged in tandem in the axial direction of the actuating rod. This means that the linear actuator is practically in the form a triple block structure which is particularly slim in outline. If on the other hand a particularly short form of the actuator is desired the control device and the sensor device may be juxtaposed transversely in relation to the longitudinal direction so that they are preferably placed diametrically opposite to each other, the operating rod having sufficient space between the two device for its translatory motion.

In order to allow a simple, immediate connection of the individual components of the linear actuator with pre-existing pressure lines and/or electrical wiring, as for example a bus, the terminal means connected with the two devices, for such lines and wiring are grouped together on the connection end, opposite to the working end, of the working unit and are more particularly in the form of a terminal unit like a plug or socket which is arranged on the device housing if desired, so that it is then possible to use multi-pole plugs which make it impossible to confuse the connections.

A particularly significant advantage of the invention is furthermore that the working end of the linear actuator is able to be kept clear of any external components which in the past have been mounted on such actuators and there is sufficient space for the load which is to be operated. Furthermore, the individual components are placed outside the working zone of the actuator so that damage is prevent right from the start.

The invention will now be explained in more detail with reference to the accompanying drawings.

LIST OF THE SEVERAL VIEWS OF THE DRAWINGS

FIG. 4 and

Figure 5:
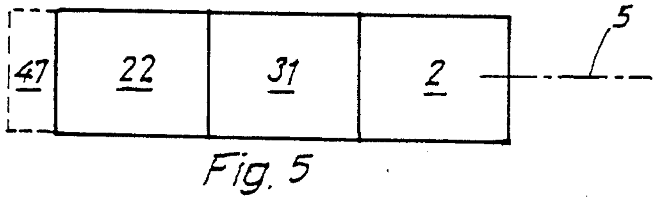

FIG. 5 diagrammatically show different possible ways of arranging the components of the device.

DETAILED DESCRIPTION OF WORKING EMBODIMENTS OF THE INVENTION

Figure 1:
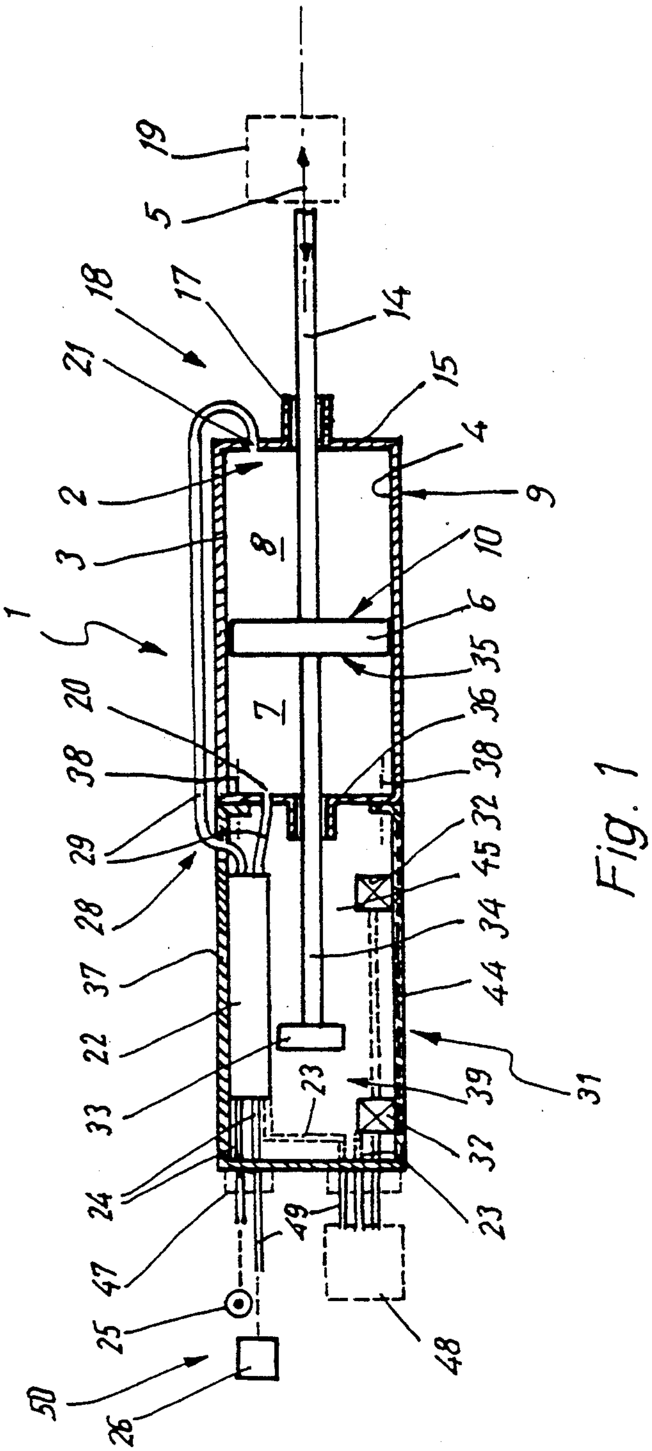
FIG. 1 shows a first embodiment of the linear actuator of the invention in a highly diagrammatic longitudinal section.
Figure 2:
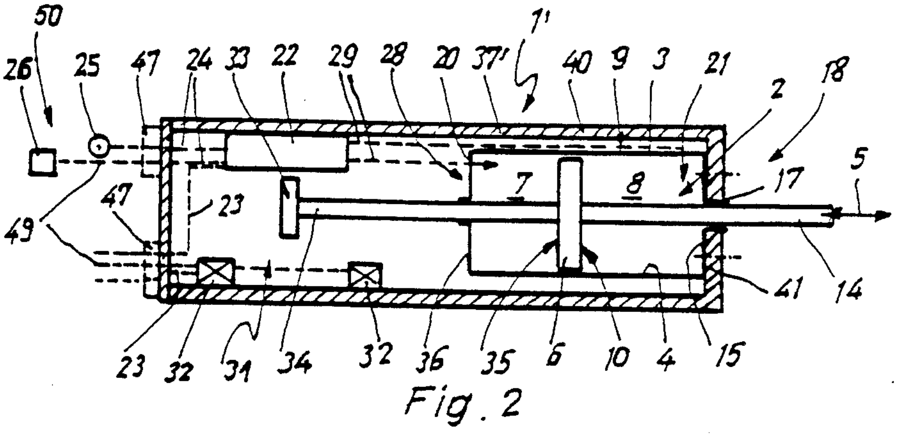
FIG. 2 depicts a further embodiment of he linear actuator in accordance with the invention in a showing similar to that of FIG. 1.
Figure 3:
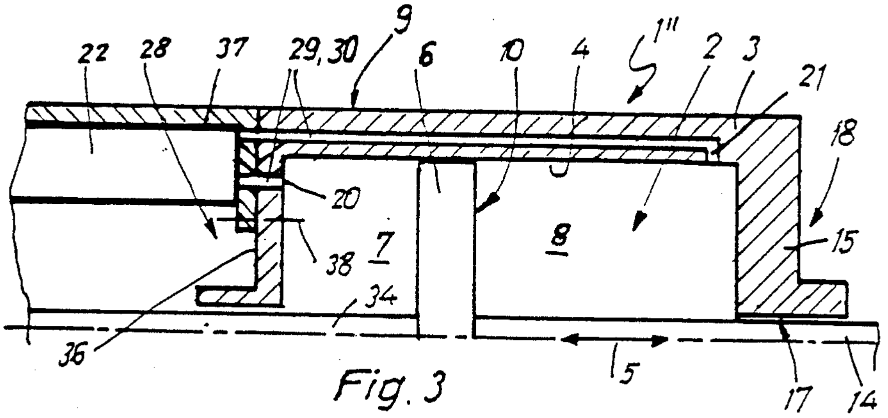
FIG. 3 is a view of part of a further working example of a linear actuator on a larger scale, in the form of a diagrammatic cross section.

The linear actuator devices 1, 1' and 1'' depicted in FIGS. 1 through 3 each comprise a linear motor 2, which is preferably in the form of a cylinder and piston unit. It comprises a motor housing 3 in the form of a cylinder enclosing a piston space 4 within which there is a axially reciprocating piston 6 moving in the direction of the double arrow 5. The piston 6 divides the interior of the cylinder into two cylinder spaces 7 and 8 in a fluid-tight manner. The cross section of the piston space 4 is preferably circular, this facilitating production and in the present working example of the invention the outer periphery 9 of the cylinder is also circular. However this is only one of a number of possible configurations which may be adopted without leaving the scope of the invention and in fact the outer periphery of the cylinder may be rectangular, as for instance square so that the motor housing 3 would generally have the form of a parallelopiped. The piston seals are not shown to simplify the drawing and their design is a matter of choice or design for the man in the art.

The axial end or side 10 of the piston 6 is connected with an actuating rod 14 which is placed coaxially in the piston space 4 and which extends through the associated piston space 8 in the longitudinal direction and passes through the adjacent end wall 15 of the motor housing 3 in a sliding and sealing manner to the outside. The end wall 15 may be an integral part of the motor housing 3 or it may be in the form of a separate and preferably detachable end cover. The position at which the piston rod extends through the cover is indicated by reference numeral 17 and in order to simplify the drawings the seal has been omitted.

The end at which the actuating rod 14 extends out of the motor housing 3 constitutes the working end 18 of the linear actuator 1, 1' and, respectively, 1''. At his position the actuating rod 14 may be connected with an element to be moved or any type of load of load connecting means, as is indicated by way of example in FIG. 1 at 19. When the two cylinder spaces 7 and 8 are filled and, respectively, vented by way of suitable connection ports 20 and 21 the piston 6 together with the actuating rod 14 fixed thereto will perform an axial translatory motion as indicated by the double arrow 5 and as a result the respective load 19 will be moved accordingly. Thus in the working example the two cylinder spaces 7 and 8 constitute respective working spaces, while on the other hand in the case of a possible modification of the invention, not shown here, one of the two spaces may also be kept in a pressureless state, if the return motion of the piston into an initial position thereof is to be performed by acting on the actuating rod 14 from the outside or via a return spring.

The control of the supply of driving fluid or medium under pressure and the venting thereof to and from the two cylinder spaces 7 and 8 is performed by a diagrammatically indicated control device 22. In the case of such control device it is a question of a valve device comprising one or more valves, the operation of which is performed electrically, the respective electrical connection wiring being indicated in broken lines at 23 in FIGS. 1 and 2. The control device 22 is furthermore connected with supply lines 24 (which are shown in broken lines in FIG. 2), which lead to a source 25 of fluid under pressure and/or a means 26 receiving fluid vented from the cylinder and which are both indicated in a diagrammatic manner. Furthermore there is a pressure fluid connection between the control device 22 and the two connection ports 20 and 21 of the linear motor 2, which takes the form of pressure fluid lines 29 (indicated in broken lines in FIG. 2), which in the context of the embodiment shown in FIG. 3 are in the form of fluid channels 30 in a form to be described below.

The respective linear actuator 1, 1' and, respectively, 1'' preferably additionally has a sensor device 31 (not shown in FIG. 3) with which certain given positions of the piston 6 and of the actuating rod 14 may be detected in order, in dependence on certain positions in translation, to cause functions of external or internal components. In the working example of the invention shown there is an internal utilization of the respective signal as produced by the sensor device at the points in time when such detection takes place, since the signals are used for operation of the control device 22. The sensor device 31 may for instance be used to detect the end positions of the piston 6 or also intermediate positions thereof as well.

In accordance with the invention the linear motor 2, the control device 22 and the sensor device 31 of the respective linear actuator 1, 1' and 1'' are fixed together and thus constitute a compact working unit, within which they may be jointly handled. The working unit will thus be seen to constitute a juxtaposition of the components 2, 22 and 31 which are three in number in the case of the working examples and may be uniformly fitted or mounted where they are to be used so that complex fitting and installation of a plurality of components is no longer required. A particular advantage in this respect is that the control device 22 and the sensor device 31 are respectively arranged on the control end 28, opposite to the working end 18, of the linear motor 2 so that the working end is free of fixtures. This improves the possibilities of fitting and installation and excludes the possibility of damage to the devices 22 and 31 by moving parts.

When the three components 2, 22 and 31 are connected in a detachable manner, as in the case of the illustrated working example of the invention, it is possible for one component to be replaced in case of failure and furthermore individual components may be exchanged for adaptation to particular applications.

The sensor device 31 as shown in FIGS. 1 and 2 is particularly advantageous. In comprises a plurality of sensors 32, as for instance 2 thereof, which are in the form of proximity switches, i.e. detector switches, able to operate without actually making contact. They cooperate with a switching part 33, which consists of magnetic material or at least comprises some magnetic component. The switching part 33 is attached to an end part of an operating or control 403 34, which preferably like the actuating rod 14 has its opposite end secured to the piston 6 on the side thereof 35 opposite to the actuating rod 14. Both the rods 14 and 34 are preferably arranged coaxially in relation to each other and they may in fact be in the form of a single component on which the piston 6 is later mounted. The rods 14 and 34 may however also be separate components which are fixed to the piston 6. At any event, the control rod 34 extends through the axial end cover 36, opposite to the end wall 15, of the motor housing 3, the position at which it extends through such cover again having support bushing and sealing means, which are not shown.

When the piston 6 is moved as indicated by the double arrow 5, the operating or switching part 33 performs a corresponding axial motion and the sensors 32, which as seen in the axial direction are to the side of the path of motion thereof, produce signals at a point in time at which they are radially opposite to the switching part 33.

In all the working examples of the invention the control device 22 and the sensor device 31 are placed in a common device housing 37 and 37'. In the case of the working examples as shown in FIGS. 1 and 3 the device housing 37 is a component which is separate from the motor housing 3 and is fixed thereto, preferably in a detachable manner. It is fixed to the control end 28 on the motor housing 3, as for instance, as illustrated, using a sort of flange connection with screw means 38. Since the device housing 32 has the same outer form and the same dimensions of the outline as the motor housing 3, the result is an elongated working unit whose overall size is such that it is narrow in the length direction. The device housing 37 preferably forms the termination of the space 39 for the accommodation of the devices 22 and 31 shutting them off from the outside so that no foreign matter is able to make its way into them and one more be reasonably certain of trouble-free operation. Preferably the one end wall 36 of the motor housing 3 forms an end cover for the flange-mounted device housing 37.

In a further possible working example of the invention which is not shown here, the device housing may at least in part be formed by the motor housing.

In the case of the working example of the invention depicted in FIG. 2 there is a housing 40 which serves to accommodate and protect both the motor housing 3 and also as the control device 22 and the control device 31. Thus the housing 40 surrounding the devices simultaneously forms the device housing 37', which in addition contains the motor housing 3. In the case of a further possible form of the invention, which is not depicted here, both the motor housing 3 and wall as a devices housing for the two devices 22 and 31 are arranged jointly in an encasing protective housing.

In addition to the above described type of sensor it is also possible to use other types of sensor. In this respect it is more particularly possible to have an optical, electronic, inductive or pneumatic sensor. It is in any case an advantage if the sensors 32 are able to be adjusted in the direction of motion of the switching rod 34 so that the point in time of response of the sensors may be adjusted. For this purpose in the embodiment of the invention shown in FIG. 1, the sensors 32 are arranged adjustably on a longitudinal guide 44 on the inner side of the device housing 37. In the working example of the invention of FIG. 2 the sensors 32 are mounted don the inner side of the surrounding housing 40 and may also be arranged to be adjustable in a suitable manner.

Figure 4:
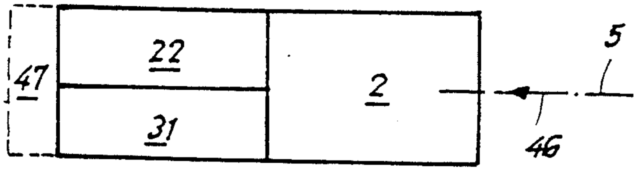

Reverting now to FIG. 1 the reader will be able to see that the control device 22 is preferably also mounted don the inner side of the device housing 37. In this respect the design is such that the control device 22 and the sensor device 31 are placed with a spacing therebetween in a direction perpendicular to the longitudinal direction 5 and are more especially placed diametrically opposite to each other so that there is ample space 45 for motion of the switching rod 34 between the two devices 22 and 31. It is in this manner that it is possible to obtain an arrangement with an overall size such that it has short length and since the sub-unit consisting of the control device 22 and the sensor device 31, of the working unit is practically fully covered over by the motor housing 3 as seen in the longitudinal direction of the linear motor 2, the result is a slim arrangement without any openings in its outer surface FIG. 4 diagrammatically shows the arrangement of the linear motor 2, of the control device 22 and of the sensor device 31 within the working unit of the linear actuator 1, and the reader will be able to see that it is a question of a triple block system, in which, when viewed in the direction 46, the two units 22 and 31 are both arranged after the linear motor 2. They are arranged side by side transversely in relation to the longitudinal axis 5.

A further possible form of arrangement is to be seen diagrammatically in FIG. 5, in which the linear motor 2, the sensor device 22 and the control device 22 also represent a triple block unit whose components are arrange din tandem in the axial direction 5. This design of the invention makes possible a still further reduction of the transverse dimension.

In the working example of FIG. 2, in which the surrounding casing 40 simultaneously constitutes the device housing 37', the control device 22 and the sensor device 31 are preferably arranged on the inner side of this housing 40. The same applies for the motor housing 3, which is preferably flange-mounted don an end wall 41 of the housing 40, the housing 40 having a through opening for the actuating rod 14.

In the working examples of the invention of FIGS. 1 and 2 the connection for the driving fluid between the control device 22 and the connection ports 20 and 21 in the motor housing 3 is via loose fluid lines 29. Owing to the compact arrangement it is possible for the lines to be kept very short in length and owing to the individual housings provided it is possible for them to be protected from the outside at least in part. In the working example of FIG. 3 there is a modification inasmuch as the pressure fluid lines 29 are in the form of channels 30 extending in the wall of the motor housing 3 and part in the wall of the device housing 37 so that given a suitable arrangement of the control device 22 it is possible to dispense with external liens. This considerably facilitates assembly and fitting. It is also possible to approach the motor housing 3 from the control device 22 via pressure fluid lines, from which point the connection with the cylinder spaces 7 and 8 is only by way of ducts or channels machined in the motor housing 3.

The supply of power and signals from the outside as required for the operation of the linear actuators 1, 1' and, respectively, 1" takes place via fluid lines 24 as already mentioned 24 nd electrical wiring 23, which may also be used for connection of the sensor device 31. In order not to have to lay each line and wire separately, in FIGS. 1 and 2 there will be seen to be connection facilities 47, marked in broken lines, which preferably take the form of plug-like connector and are secured to the device housing 37 and 37'. They are connected via wires 23 and supply leads 24, respectively, permanently with corresponding positions of the two devices 22 and 31 and make possible the connection of external lines 49, which may lead to a supply 25 of pressure fluid, a means 26 for receiving vented fluid or, for instance, an electronic control unit 48 (marked in broken lines). The design as a connection unit makes it possible to rapidly make a connection (which may be undone again) with the lines 49 as part of a central plug connection means, in which respect it is possible to have so-called pneumatic and/or electrical multi-pole plug means. The connection with a bus is thus possible in a trouble-free manner. In all these designs it is an advantage if the said connection facilities 47 are arranged on the connection end 50, opposite to the working end 18 so that even after the connection has been made there is no increase in the over width of the linear actuator.

The invention thus provides a way of juxtaposing various devices as a single structural unit, there being devices with three or four functional planes or levels dependent on the particular design. In FIGS. 1, 2 and 4 there are three levels, the first level being represented by the linear motor 2, the actuating means, the second level is represented by the sub-unit consisting of the control device (the processor) nd the sensor device and the third level is represented by the level of the connection facilities 47, the bus level. In the working example in accordance with FIG. 5 there are four levels, since the devices 22 and 31 are placed one after the other in the axial direction.

A significant advantage of the invention is also to be seen in the fact that the user has a complete system tailored to his needs which he may purchase form a single supplier, whereas previously a large number of separate components had to be ordered, stored, assembled and serviced in order to have the desired instrumentality. Furthermore putting into operation is substantially simpler in the invention than in the prior art since practically only two plug connections (in the form of pneumatic and electrical multi-pole connectors) have to be made in order to have the device ready for operation.

What is claimed is:

1. A linear actuator, comprising: a linear motor having a motor housing which has a working end and a control end and which contains an axially movable piston coupled to an actuating rod extending out of said motor housing at said working end thereof; a control device which controls operation of said motor; and sensor means for sensing the position of said actuating rod, said sensor means including at least one sensor; wherein said linear motor, said control device and said sensor are connected to each other to form a readily handled working unit, and said control device and said sensor are locate don a side of said control end of said linear motor remote from said working end; wherein said sensor means includes an operating rod coaxial to said actuating rod and coupled to said piston on a side thereof opposite from said actuating rod, said operating rod extending out of said motor housing at said control end thereof and having on a portion disposed outside said motor housing at lest one switching part, said sensor being positionally adjustable in the direction of motion of said operating rod and being responsive to the position of said switching part, wherein said control device and said sensor are arranged transversely side by side in relation to the longitudinal direction of said actuator and are spaced sufficiently to allow said operating rod to extend therebetween.

2. The linear actuator as claimed in claim 1, wherein said linear motor, said control device and said sensor are detachable connected to each other.

3. The linear actuator as claimed in claim 2, including a sub-unit which has therein said control device and said sensor and which, as seen in the longitudinal direction of the linear motor from said working end thereof, is substantially disposed behind said motor housing.

4. The linear actuator as claimed in claim 1, wherein said control device and said sensor are provided in a common device housing.

5. The linear actuator as cliamed in claim 4, wherein said device housing is at least partly formed by the motor housing.

6. The linear actuator as claimed in clam 4, wherein said device housing is detachably screwed to a flange provided at said control end of said motor housing of said linear motor.

7. The linear actuator as claimed in claim 4, wherein said motor housing, said control device and said sensor are arranged in a common encasing housing, said control device and said sensor being arranged in a device housing which surrounds said encasing housing.

8. The linear actuator as claimed in claim 1, wherein said control device is connected via driving fluid lines with at least one of two cylinder spaces separated by the piston in the motor housing said fluid lines extending adjacent to the housing and being formed at least in part by channels in the wall of the housing.

9. The linear actuator as claimed in claim 1, including connection facilities which are connected with said control device and said sensor for external electrical and pneumatic lines, which are disposed on said connection end of said motor housing and which each include one of a cooperating plug and socket.

10. The linear actuator as claimed in claim 1, wherein said sensor is a proximity sensor.

11. The linear actuator as claimed in claim 1, wherein said sensor and said control device are provided on diametrically opposite sides of said operating rod.

* * * * *